E. Gale,
Wire Fence,
N° 36,996.        Patented Nov. 25, 1862.
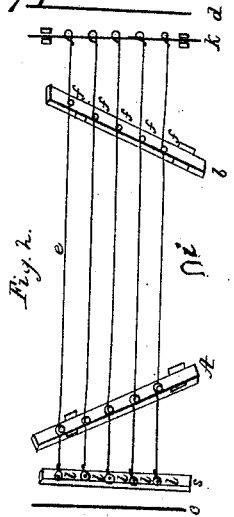
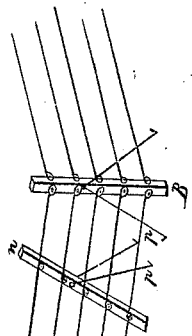
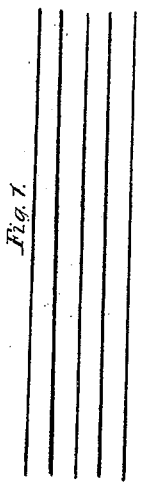
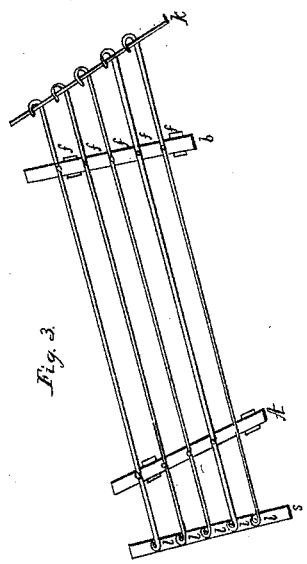
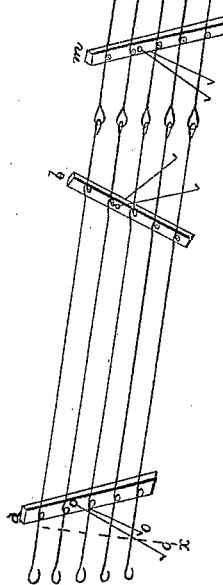
Witnesses:
F. L. Wickham
John Evans
Inventor:
Elbridge Gale

UNITED STATES PATENT OFFICE.

ELBRIDGE GALE, OF KENDALL, ILLINOIS.

IMPROVEMENT IN PORTABLE FENCES.

Specification forming part of Letters Patent No. 36,996, dated November 25, 1862.

*To all whom it may concern:*

Be it known that I, ELBRIDGE GALE, of the town of Kendall, in the county of Kendall and State of Illinois, have invented a new and Improved Portable Fence; and I do hereby declare that the following is a full and exact description thereof, reference being had to the accompanying drawings, and to the letters of reference marked thereon.

My invention consists in an essential modification of the ordinary wire fence, first, by the combination of lateral and longitudinal braces, dispensing with the use of permanent posts; and, second, by making the fence in sections so looped or jointed together as to be easily folded up and removed from place to place.

I now proceed to describe the construction of this fence.

First, cut the wire into such uniform lengths as may be desired. (See Figure I.) Second, fasten two standards securely in a horizontal position and obliquely with respect to each other upon the ground or upon a frame prepared for the purpose, as seen at A $b$, Fig. II. The pieces of timber $c$ $d$ are then secured at such a distance apart as to permit the wire $e$ to just lie upon the standards between them, as seen at Fig. II. These timbers serve simply to aid in bringing the wires to a uniform position upon the standards A $b$. Spikes with large heads are then driven into the standards $a$ and $b$ at such distance apart as it may be desired to place the wire. Around each of these the wire is to be coiled, as at $f f f$, Fig. II. Then over each of these coils may be driven a staple, $i$. If the standards $a$ $b$ should be made of iron, the wire could be bolted to them, or they may be otherwise attached to the wood standards, the object being to hold them firmly in their place. It remains now to loop the wires to a uniform length and in an opposite direction at the respective ends. This may be done by bending the wires over the rod $k$, secured across them at one end, Fig. III, and around the pins $l l l l$ at the other, which pins are driven into the timber $s$, also firmly secured in its place. When thus prepared, the length of fence is ready to be joined to others in the line, as seen in Fig. IV.

Each of the standards in this fence answers the purpose of a post, and at the same time, by being placed obliquely in the line of the fence $a b m n$, Fig. IV, constitutes a longitudinal brace. For the purpose of support, these posts are given alternatly an opposite obliquity, as at $a b$, Fig. IV. Two lateral braces are then attached to each post, as $o o p p$, which may be made either of wood or other material. These braces act not only laterally, but also, for two reasons, longitudinally: first, because of the oblique position of the standards $a b$; and, second, by having the feet of the braces $o o$ carried along the line of the fence to or beyond a perpendicular, $x$, drawn through the top of the post $a$, the braces are made to act directly on the line of the fence, so that the braces $o o$ not only act laterally, but by themselves and also in conjunction with the post $a$ along the line of the fence toward B, while $p p n$ act in the same manner along the line of the fence toward A. Such is the relative position of these braces and posts that they secure great strength with extreme lightness of material.

What I claim is—

A wire fence constructed in sections with the posts set obliquely and braced, as described, the whole constructed and arranged in the manner and for the purpose as set forth.

ELBRIDGE GALE.

Witnesses:
F. L. WICKHAM,
JOHN EVANS.